(12) United States Patent
Ludois et al.

(10) Patent No.: US 11,626,781 B2
(45) Date of Patent: *Apr. 11, 2023

(54) DOUBLE LAYER CAPACITIVE COUPLER FOR TRANSMITTING ELECTRICAL POWER BETWEEN MOVING MECHANICAL ELEMENT

(71) Applicant: Wisconsin Alumni Research Foundation, Madison, WI (US)

(72) Inventors: Daniel Ludois, Middleton, WI (US); Kevin Frankforter, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 256 days.

This patent is subject to a terminal disclaimer.

(21) Appl. No.: 16/845,321

(22) Filed: Apr. 10, 2020

(65) Prior Publication Data

US 2021/0320569 A1 Oct. 14, 2021

(51) Int. Cl.
| | | |
|---|---|---|
| *H02K 13/00* | (2006.01) | |
| *H01G 11/26* | (2013.01) | |
| *H02K 9/193* | (2006.01) | |
| *H02K 7/08* | (2006.01) | |
| *H01G 11/34* | (2013.01) | |
| *H01G 11/60* | (2013.01) | |

(52) U.S. Cl.
CPC ......... *H02K 13/003* (2013.01); *H01G 11/26* (2013.01); *H02K 7/083* (2013.01); *H02K 9/193* (2013.01); *H01G 11/34* (2013.01); *H01G 11/60* (2013.01)

(58) Field of Classification Search
CPC .......... H02K 7/083; H02K 9/19; H02K 9/193; H02K 9/197; H02K 13/003; H01G 9/07; H01G 9/08; H01G 11/26; H01G 11/34; H01G 11/60
USPC ........................................... 310/54, 68 R, 71
See application file for complete search history.

(56) References Cited

U.S. PATENT DOCUMENTS

| | | |
|---|---|---|
| 2013/0043762 A1 | 2/2013 | Ludois et al. |
| 2014/0194746 A1 | 7/2014 | Moore et al. |
| 2014/0197710 A1 | 7/2014 | Ludois et al. |
| 2016/0006485 A1 | 1/2016 | Habraken et al. |
| 2016/0301121 A1 | 10/2016 | Dandlberger et al. |
| 2016/0329780 A1 | 11/2016 | Reed et al. |
| 2018/0006493 A1 | 1/2018 | Ludois et al. |
| 2018/0116737 A1 | 5/2018 | Bajo et al. |
| 2021/0211069 A1* | 7/2021 | Reed ...................... H02N 1/004 |
| 2021/0265889 A1* | 8/2021 | Frampton .......... H02K 15/0407 |
| 2021/0270593 A1* | 9/2021 | Mann .................... G01D 5/2415 |
| 2021/0391810 A1* | 12/2021 | Reitz ........................ H02N 1/08 |
| 2022/0077551 A1* | 3/2022 | Pröckl .................... H01P 1/067 |
| 2022/0158529 A1* | 5/2022 | Ludois ................. H02K 19/365 |

FOREIGN PATENT DOCUMENTS

KR 20170137905 A 12/2017

* cited by examiner

*Primary Examiner* — Rashad H Johnson
(74) *Attorney, Agent, or Firm* — Boyle Fredrickson, S.C.

(57) ABSTRACT

A capacitive coupler provides high coupling capacitance through the use of an electrical double layer formed on opposite plates of the coupler. The coupler can be independent or provide a hydrodynamic or hydrostatic bearing as well as capacitive coupling and the circulated dielectric can provide for cooling of associated machinery.

20 Claims, 4 Drawing Sheets

DOUBLE LAYER CAPACITIVE COUPLER FOR TRANSMITTING ELECTRICAL POWER BETWEEN MOVING MECHANICAL ELEMENT

STATEMENT REGARDING FEDERALLY SPONSORED RESEARCH OR DEVELOPMENT

—

CROSS REFERENCE TO RELATED APPLICATION

—

BACKGROUND OF THE INVENTION

The present invention relates generally to power couplers for transmitting electrical power between moving mechanical elements and in particular to a capacitive coupler having substantially increased power transfer capability.

Electrical machines, such as doubly fed induction machines (DFIMs), wound field synchronous machines (WFSMs), and direct current homopolar machines (DCIMs) require the transfer of electrical power from a stationary power source to a rotating or linearly moving rotor or slider. This can be done by a power coupler, for example, commonly using slip rings providing for electrically conducting brushes that slide along a conductive surface, or an inductive coupler providing inductive coupling between transformer windings where the primary and secondary windings move with respect to each other, or by a capacitive coupler having capacitor plates where the capacitor plates may move with respect, to each other.

An example of a capacitive coupling system of this type, used with a wound field rotating machine, is described in U.S. Pat. No. 9,692,279 entitled: "Wound Field Rotating Machine with Capacitive Power Transfer" assigned to the assignee of the present invention and hereby incorporated by reference.

A capacitive coupler has a considerable advantage over slip rings with respect to service life, eliminating the wear experience with sliding brushes. With respect to an inductive coupler, a capacitive coupler can be far simpler to construct, lighter weight, and more resistant to damage from vibration and the like. Nevertheless, such capacitive couplers normally achieve only low levels of coupling capacitance (on the order of picofarads). For this reason such capacitive couplers may need to operate at extremely high frequencies or be limited to relatively low power.

SUMMARY OF THE INVENTION

The present invention provides a capacitive power coupling that greatly increases the capacitance of the coupling by circulating an electrolyte or ionic liquid between the capacitive plates to form an electrical double layer on those plates. In this way, the capacitive coupling can be boosted by several orders of magnitude rendering, for example, capacitive couplers practical for low-frequency power transfer in high-power electrical machines. In some cases, the ionically conductive liquid may also be used as a bearing material in a hydrodynamic or hydrostatic bearing, supporting separate components of the associated machine for movement, and can be circulated for cooling.

More specifically, one embodiment of the invention provides a power coupler having a first support providing a first electrically conductive material exposed on an outer surface of the first support and a second support adapted to move with respect to and adjacent to the first support through a range of motion, the second support providing a second electrically conductive material exposed on an outer surface of the second support in opposition across a gap to the first electrical conductor through the range of motion. A first and second conductor communicate with each of the first electrically conductive material and second electrically conductive material to establish an electrical potential difference between respective of the first and second conductor and the first electrically conductive material and second electrically conductive material. Finally, an electrolyte positioned within the gap cooperates with at least one of the first and second electrically conductive materials to form an electrical double layer presenting a capacitance between the electrical connections of greater than 1 µF.

It is thus a feature of at least one embodiment of the invention to greatly increase the capacitance of such capacitive couplers allowing greater power transfer at lower frequencies.

The power coupler may include a pump for pumping the electrolyte into the gap through the range of motion.

It is thus a feature of at least one embodiment of the invention to provide a capacitive coupler that can do double duty as a hydrodynamic bearing or a cooling subsystem or that can be used practically in linear bearing systems.

The first support may provide a channel passing through the first support to the gap to receive fluid from the pump and wherein the first support further includes distribution grooves to distribute electrolyte from the channel along the gap.

It is thus a feature of at least one embodiment of the invention to permit improved distribution of a flowing electrolyte between capacitor plates by providing distribution channels and/or pumping action through grooves.

The first and second electrical conductors may be activated carbon.

It is thus a feature of at least one embodiment of the invention to greatly increase the surface area of the capacitor plates with respect to double layer formation in distinction from the plate area that would occur with a regular capacitor.

The solution is water holding a dissolved ionic material.

It is thus a feature of at least one embodiment of the invention to provide a low-cost electrolyte suitable for forming a double layer also having high specific heat fir improved heat transfer properties.

Alternatively, the solution may be an organic solvent holding a dissolved ionic material.

It is thus a feature of at least one embodiment of the invention to provide a low chemical reactivity, high conductivity electrolyte that forms double layers and is more amenable to use in an electrical environment.

The first support may be a shaft and the second support a collar around the shaft and the range of motion is relative rotation between the first support and the second support, or the first support may be a track and the second support a collar around the track and the range of motion is relative linear motion between the first support and the second support.

It is thus a feature of at least one embodiment of the invention to provide a versatile power coupler that can be used in rotary or linear coupling applications.

In one embodiment, the invention may provide an electrical machine having a stator providing a set of electrically conductive stator coils and a rotor position to move with respect to the stator and providing a set of electrically conductive stator coils, the rotor and stator operating to provide at least one of an electrical generator and electrical motor. The electrical machine may further include a first and second capacitive coupler each having: (a) a first support fixed with respect to the stator and providing a first electrically conductive material exposed on an outer surface of the first support; (b) a second support fixed with respect to the rotor and adapted to move with respect to and adjacent to the first support through a range of motion, the second support of providing a second electrically conductive material exposed on an outer surface of the second support in opposition across a gap to the first electrical conductor through the range of motion; and (c) a first and second conductor communicating with each of the first electrically conductive material and second electrically conductive material to communicate an electrical potential between respective of the first and second conductor and the first electrically conductive material and second electrically conductive material; wherein the second conductors are attached to the rotor coils. As described above, an electrolyte may be positioned within the gap and cooperate with at least one of the first and second electrically conductive materials to form an electrical double layer presenting a capacitance between the electrical connections of greater than 1 µF.

It is thus a feature of at least one embodiment of the invention to provide a capacitive coupler that can permit the construction of high-power and low-frequency electrical machines without the drawbacks of slip rings.

The first and second capacitive coupler may provide bearings supporting the rotor with respect, to the stator.

It is thus a feature of at least one embodiment of the invention to provide a capacitive coupling system that does double duty as a hydrostatic or hydrodynamic bearing offering extremely low resistance and wear.

The invention may further include at least one spray nozzle communicating with a pump to direct electrolyte over surfaces of the stator and/or rotor coils for cooling.

It is thus a feature of at least one embodiment of the invention to provide a capacitive coupling system where the electrolyte can form part of a cooling subsystem.

The spray nozzle may be an orifice on at least one of the first and second capacitive couplers communicating with the gap.

It is thus a feature of at least one embodiment of the invention to provide a simple way of using the electrolyte cooling by spraying it from the coupler.

The electrical machine may provide a doubly fed induction machine.

It is thus a feature of at least one embodiment of the invention to permit a method of using capacitive coupling for a doubly fed induction machine that requires low-frequency at high power impractical with conventional capacitive couplers.

Alternatively, the electrical machine may be a homopolar motor.

It is thus a feature of at least one embodiment of the invention to permit a "universal" homopolar motors that can connect directly to high power AC sources.

These particular objects and advantages may apply to only some embodiments falling within the claims and thus do not define the scope of the invention.

DETAILED DESCRIPTION OF THE PREFERRED EMBODIMENT

Figure 1:
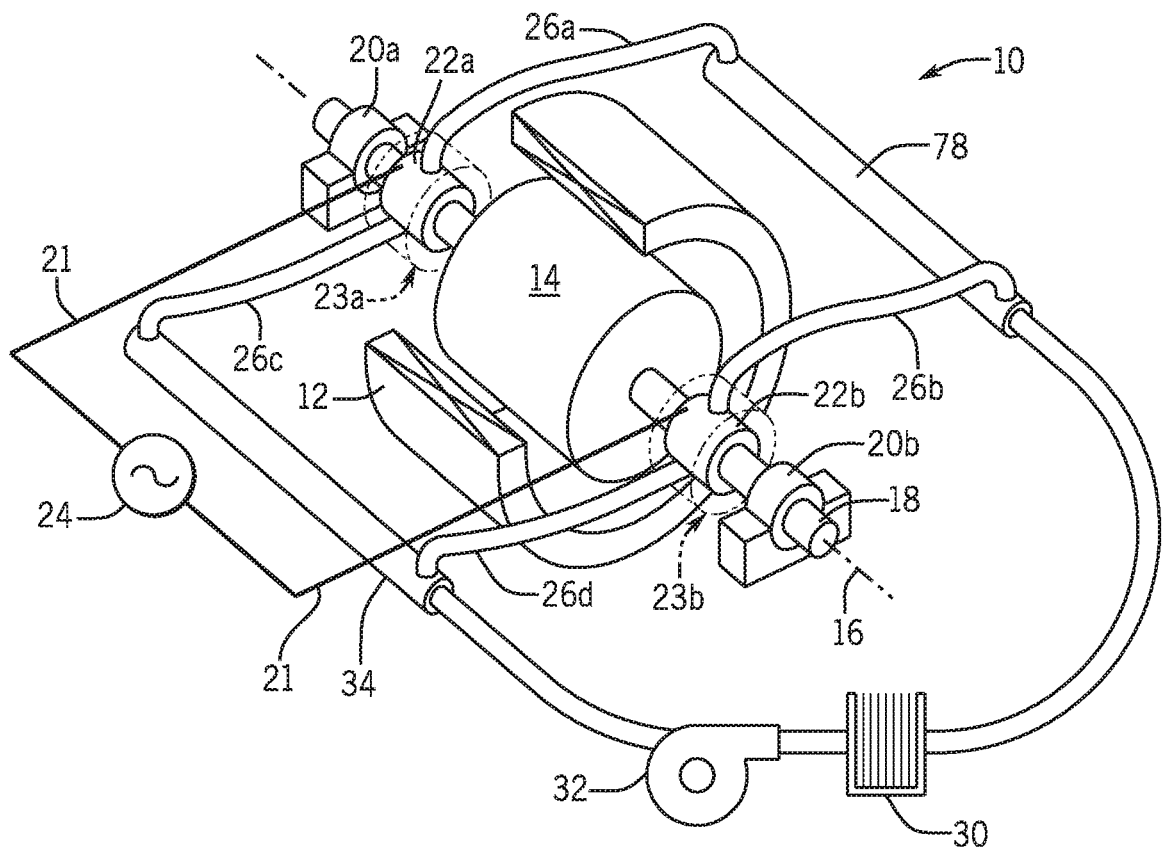
FIG. 1 is a fragmentary perspective view of a rotating electrical machine using capacitive couplers of the present invention positioned on the shaft of a rotating rotor for communicating power to the rotor.

Referring now to FIG. 1, a rotating electrical machine 10, for example, operating as a generator or as a motor, may include a stationary stator 12 coaxially surrounding a rotor 14. In this embodiment, the rotor 14 may rotate about an axis 16 on a shaft 18, the latter supported by bearings 20a and 20b, for example, roller or ball bearings, of conventional design.

In various embodiments, the stator 12 and rotor 14 each support electrical coils configured to produce particular configurations of any of a wound field synchronous machine (using powered rotor windings in lieu of permanent magnets), a direct current homopolar machines (DCHMs) (operating using AC by having an in-phase rotor and stator magnetic field polarity), and a doubly fed induction machine (having rotor coils with current matching the slip frequency). These last two types of machine desirably requires the transmission of rotor current at a low frequency difficult to obtain directly through current capacitive coupling systems.

Henceforth, for descriptive simplicity, the following discussion will be directed to rotating electrical machines 10 that are motors; however, it will be appreciated that the present invention applies to rotating electrical machines 10 operating either as a generator or motor.

Figure 2:
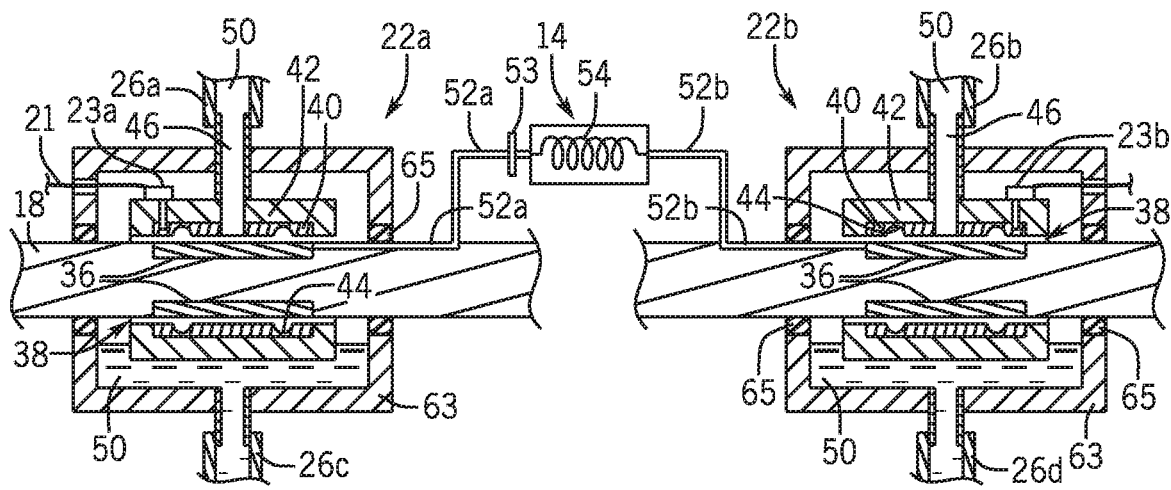
FIG. 2 is an elevational cross-section of the rotor shaft of FIG. 1 showing the internal construction of the capacitor plates and electrical communication with rotor inductance.

Referring also to FIG. 2, two capacitive couplers 22a and 22b may be positioned on opposite sides of the rotor 14 surrounding the shaft 18. Each of these capacitive couplers 22a and 22b and may have conductors 23a and 23b connecting by lines 21 different terminals of an electrical power source 24 providing electrical power to the rotor 14.

In addition, each of the capacitive couplers 22a and 22b may be connected by tubular conduits 26a and 26b to a manifold 28 providing a source of a liquid electrolyte 50. The manifold 28 may communicate with an optional cooler 30 which in turn receives pressurized electrolyte from a pump 32. Each of the couplers 22a and 22b may also communicate through conduits 26c and 26d with a collection manifold 34 receiving electrolyte from the couplers 22 and returning it to the pump 32 in a closed loop system.

The shaft 18 within each of the couplers 22 may provide a circumferential outward surface 36, for example, of a high surface area electrically conducting coating such as activated carbon that will form one plate of the capacitive coupler. Coaxially surrounding this circumferential outward surface 36, across a separation gap 38, is a circumferential inward surface 40 of a collar that will form a second plate of the capacitive coupler. This circumferential inward surface 40 may also be a high surface area material such as activated carbon and in turn, may be surrounded by an outer support 42 of a different material to provide improved mechanical integrity.

The circumferential inward surface 40 (and/or the circumferential outward surface 36) may have exposed grooves 44 that serve to distribute and in some cases pump electrolyte 50 in the gap 38 with rotation of the shaft 18, this electrolyte 50 being received from a fluid entrance channel 46 passing through the outer support 42 and the inner circumferential inward surface 40 to deliver electrolyte 50 to the gap 38.

The conductors 23 provide for electrical connection between the power distribution line 21 from the electrical power source 24 and the inward surface 40 of the respective coupler 22a and 22b. The shaft 18, in turn, may support conductive lines 52a and 52b connected from each respective coupler 22a and 22b to opposite sides of the inductance 54 of the coils of the rotor 14 to complete the circuit through the rotor 14. The rotor 14 may include an optional rectifier assembly 53 in series with the inductance 54 to convert the AC power to DC when a synchronous machine is desired. These lines 52 and the circumferential outward surface 36 may be electrically insulated from the metal of the shaft 18 (for example, by an insulating adhesive or the like) or the shaft 18 may include an insulating conductive stop along its length between the couplers 22a and 22b (not shown) to keep the shaft 18 from shorting the electrical path around the rotor 14.

Figure 3:
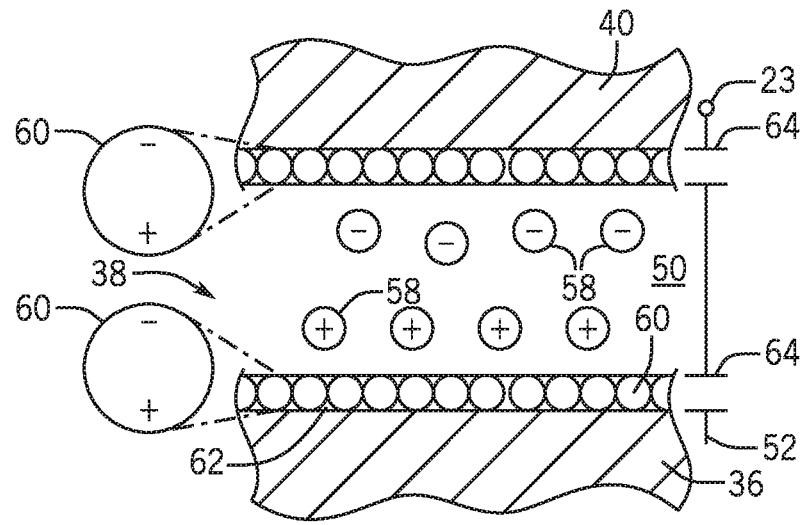
FIG. 3 is a diagrammatic fragmentary enlarged cross-section of the interface between the rotating and stationary plates of the capacitive coupler of FIG. 2 showing the formation of an electrical double layer and its electrical equivalent.

Referring now to FIG. 3, the gap 38 between the circumferential inward surfaces 40 and the corresponding circumferential outward surfaces 36, during operation of the couplers 22, will hold a film of electrolyte 50 that separates the circumferential outward surface 36 and circumferential inward surface 40. This electrolyte 50 provides electrical ions 58 dissolved in a polar solvent 60, the latter of which is adapted to form a thin dielectric insulating layer 62 of solvent molecules at each of the circumferential outward surfaces 36 and circumferential inward surfaces 40. When the surfaces 36 and 40 are electrically polarized (charged) the dissolved ions 58 oppositely charged as the respective surfaces (counterions) accumulate to form a layer of excess charge in close proximity to each surface. Concurrently, an excess or deficiency of electrons form a layer immediately internal to surfaces 36 and 40 which mirrors and is opposite in charge of the ionic layer external to the surfaces. The dielectric insulating layer 62 separates the ions 58 from the respective surfaces preventing direct electrical flow therebetween while providing capacitive coupling. Together the opposed dielectric insulating layers 62 form an electrical double layer at each surface providing two series-connected super- or ultra-capacitances 64 between conductor 23 and line 52. The extreme thinness of the dielectric layer 62 (typically less than 1 nm in a strong electrolyte and more generally less than 5 nm) and the high surface area of the activated material of the outward surface 36 and inward surface 40 (this microscopic surface area not depicted in FIG. 3) allow capacitances 64 in excess of 1 µF and conformably in excess of 40 µF and potentially in excess of 100 µF to be obtained.

A wide variety of materials may be used for the circumferential outward surface 36 and circumferential inward surface 40 making use of existing ultra- or super-capacitor technology. These materials include carbon, activated carbon as mentioned, graphite as well as conducting polymers and porous metal oxides. Similarly, many different electrolytes 50 known in this art may be used including the polar solvents of water, for example, dissolving ions from acids such as sulfuric acid, bases such as potassium hydroxide, neutral salts potassium sulfate or lithium perchlorate, or organic salts such as quaternary ammonium salts or salts of carboxylic acids. The electrolyte 50 may also use organic solvents such as acetonitrile, propylene carbonate, tetrahydrofuran, diethyl carbonate, and γ-butyrolactone which may include ion species inorganic salts such as lithium hexafluorophate and sodium perchlorate or organic salts such as triethylmethylammonium tetrafluoroborate. Alternatively, the electrolyte 50 may be an ionic liquid such as 1-ethyl-3-methylimidazolium tetrafluoroborate.

Referring again to FIG. 2, in one embodiment, the circumferential inward surface 40 and outer support 42 may be supported within by a surrounding collection chamber 63, for example, being a hollow cylindrical vessel with openings in its axial bases to permit passage of the shaft 18 having and seals 65 sealing against that rotating shaft 18 to prevent the escape of liquid as is generally understood in the art. The collection chamber 63 may connect to the conduits 26 to collect electrolyte 50 passing out of the gap 38 during rotation of the shaft 18 while this electrolyte 50 is replenished through conduit 26a.

Figure 4:
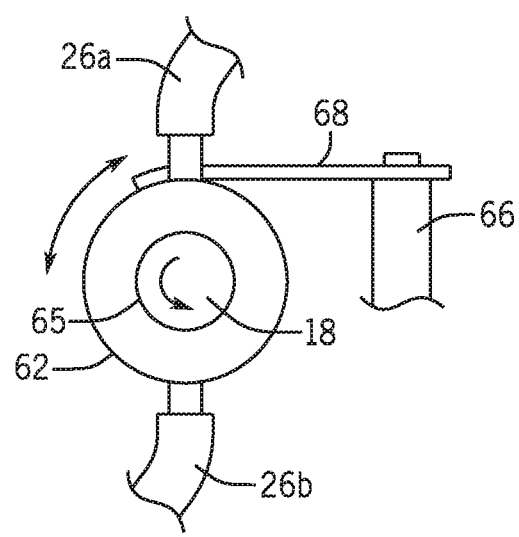
FIG. 4 is an end elevational view of a coupler 22 showing a floating mounting allowing the coupler to self-center on the shaft.

Referring now to FIG. 4, in one embodiment, the collection chamber 63 may be attached to stationery structure 66 of the electrical machine 10 with a floating mounting 68 (for example, a spring or resilient arm as shown) allowing the assembly of the collection chamber 63, outer support 42, and inward surface 40 to float, adapting to slight eccentricities of the shaft 18 separated from the shaft 18 by the film of the electrolyte 50. In this way, the materials of the circumferential outward surface 36 and circumferential inward surface 40 may be selected according to favorable electrical properties with less concern with physical strength against axial or radial forces.

Referring again to FIG. 1, in one embodiment, the couplers 22 may operate as hydrodynamic bearings having a nonrotating component fixed to stationary support to support the shaft 18 with the bearings 20 serving to provide support prior to the hydrodynamic effect coming into play.

Alternatively, and referring to FIG. 4, the outer support 42 may be fixed firmly to stationary supporting structure 66 so that the capacitive couplers 22 may provide for load supporting bearings supporting the shaft 18 against axial displacement in the manner of the bearings 20 which may then be eliminated.

In this figure, only one capacitive coupler 22b is shown for simplicity, it being understood that the other capacitive coupler 22a will follow the mirror image of this description. In this embodiment, the capacitive coupler 22b provides a bearing by means of a hydrodynamic film of electrolyte 50 flowing through conduit 26a into the gap 38 under pressure provided by the pump 32 (shown in FIG. 1). A seal 71 may be provided on only one side (the outer side) of each of the capacitor couplers 22b while the inner side may be left open or have apertures in a seal to provide one or more spray nozzles that spray electrolyte 50 onto the rotor 14 or other parts of the rotating electrical machine 10 for cooling. A collection shroud 70 may be positioned around the rotor 14 to collect excess electrolyte 50 to be received by conduit 26d and recycled to the pump 32 and cooler 30 (shown in FIG. 1).

Alternatively, the film of electrolyte 50 may provide for a hydrostatic bearing according to methods known in the art.

Figure 5:
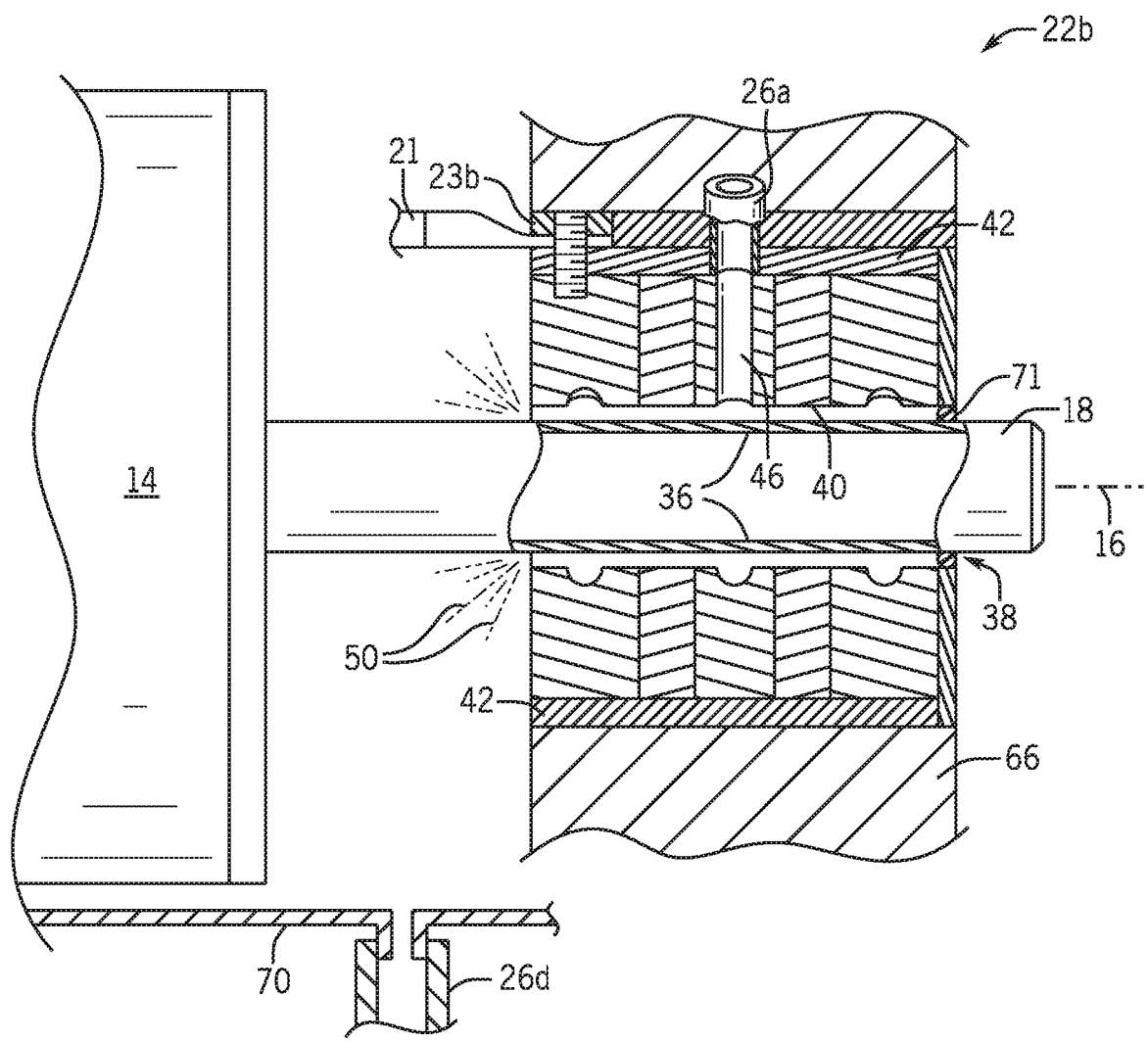
FIG. 5 is a cross-section of one capacitive coupler of a pair that may be configured as a hydrodynamic bearing and showing a conduit from out of the bearing to spray electrolyte on the rotor in one cooling embodiment.

Referring still to FIG. 5, the conductive inward surface 40 in this embodiment may be formed by radially extending plugs of material (for example, carbon) passing through the outer support 42, a structure that may provide improved mechanical support of the conductive inward surface 40 when fragile materials are selected. The outer support 42, in this case, may provide for an independent bearing material, for example, a sintered bronze material, presenting a secondary bearing system.

It will be appreciated that alternatively, a separate spray nozzle (not shown) may be connected in parallel from conduit 26a to provide additional or alternative sprays of cooling electrolyte 50.

Figure 6:
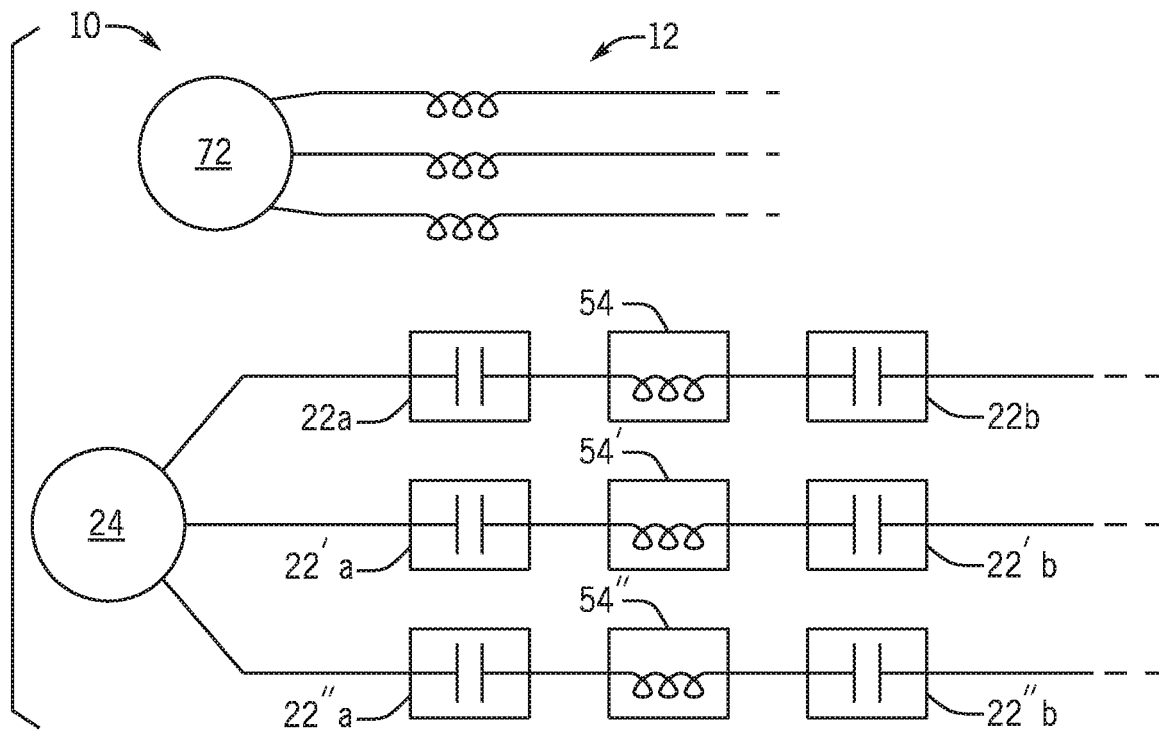
FIG. 6 is a schematic diagram of the capacitive couplers system of FIGS. 2 and 5.
Figure 7:
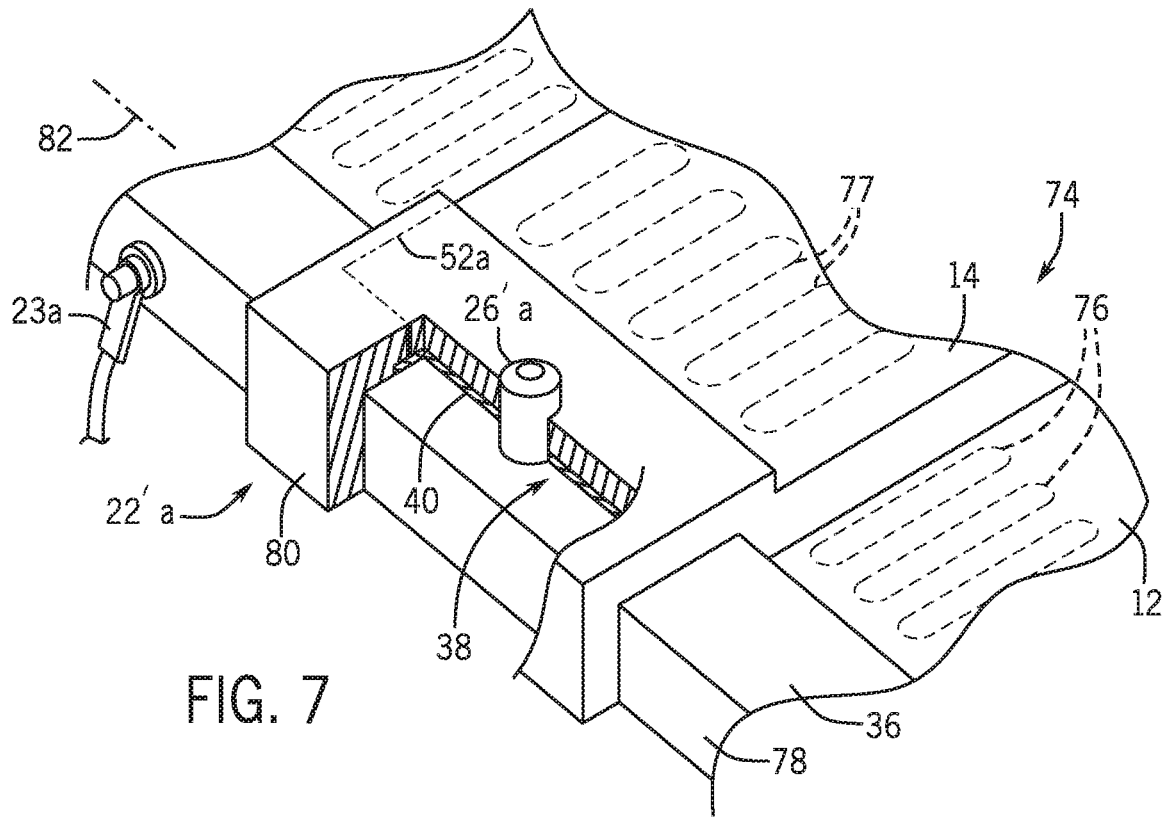
FIG. 7 is a partial cutaway of a capacitive coupler providing a power coupling and a bearing surface for a linear electrical machine.

Referring now to FIG. 6, it will be appreciated that the number of couplers 22 may be increased to provide for an arbitrary number of phases of the electrical machine 10, for example, to produce a doubly fed induction machine (DFIM) where each of the rotor phases may be separately controlled to produce a desired slip speed. As depicted, multiple pairs of couplers 22a/22b, 22'a/22'b, and 22"a/22"b may be positioned respectively to flank respective rotor inductances 54, 54' and 54" of separate rotor coils to provide independent control of each coil as driven by multiphase electrical power source 24. Similarly one or more coils of the stator 12 may be provided independently driven by a multiphase drive voltage 72 allowing complete flexibility in the configuration of the rotor and stator magnetic fields to produce a wide variety of electrical machines as described. In contrast, a single phase system may be used to produce a homopolar motor as discussed, by synchronizing the phase of the rotor and stator (or placing them in series with a common power supply), or wound field synchronous machine (WFSM) by using a rectifier assembly discussed above to provide DC power to the rotor 12. Details of construction of a WFSM motor suitable for use with the present invention using the present capacitive couplers is found in US patent application 2014/0197,710 entitled: "Wound Field Rotating Machine With Capacitive Power Transfer" assigned to the assignee of the present invention and hereby incorporated by reference. Referring now to FIG. 7, the present invention may find application not only with rotating machines but linear machines, for example, a linear motor 74 providing for linearly arrayed stator coils 76 of a stator 12 positioned adjacent to interacting coils 77 of a linearly translating rotor 14. In this embodiment, electrical power may be communicated to the stator 12 by a linear coupler 22'a functionally analogous to coupler 22a described above. The linear coupler 22'a includes a conductive outward surface 36 on a linear track 78 and the conductive inward surface 40 on the inner surface of a collar 80 slidably fitting over the track 78 to slide with respect to the track 78 along axis 82. The linear coupler 22'a may also provide for a load supporting linear bearing supporting the stator 12 with the linear track 78 and analogous to the bearing of FIG. 5. For this purpose, the collar 80 may receive pressurized fluid through conduit 26'a to be conducted to a gap 38 between the collar 80 and the conductive outward surface 36.

A similar coupler 22'b will be provided opposite coupler 22'a with respect to the rotor 14 but not shown. In other respects the electrical function of this linear machine represented by linear motor 74 will be the same as discussed above.

The term rotor and stator as used herein should be understood to apply both to rotating electrical machines and analogous structures in linear electrical machines.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A power coupler comprising:
a first support providing a first electrically conductive material exposed on an outer surface of the first support;
a second support adapted to move with respect to and adjacent to the first support through a range of motion, the second support providing a second electrically conductive material exposed on an outer surface of the second support in opposition across a gap to the first electrically conductive material through the range of motion;
a first and second conductor communicating with each of the first electrically conductive material and second electrically conductive material to establish an electrical potential difference between respective of the first and second conductor and the first electrically conductive material and second electrically conductive material; and
an electrolyte positioned within the gap and cooperating with at least one of the first and second electrically conductive materials to form an electrical double layer presenting a capacitance between the electrical connections of greater than 1 µF.

2. The power coupler of claim 1 further including a pump for pumping the electrolyte into the gap through the range of motion.

3. The power coupler of claim 2 wherein the first support provides a channel passing through the first support to the gap to receive fluid from the pump and wherein the first support further includes distribution grooves to distribute electrolyte from the channel along the gap.

4. The power coupler of claim 1 wherein the first and second electrically conductive materials are activated carbon.

5. The power coupler of claim 1 wherein the electrolyte is water holding a dissolved ionic material.

6. The power coupler of claim 1 wherein the electrolyte is an organic solvent holding a dissolved ionic material.

7. The power coupler of claim 1 wherein the first support is a shaft and the second support is a collar around the shaft and the range of motion is relative rotation between the first support and the second support.

8. The power coupler of claim 1 wherein the first support is a track and the second support is a collar around the track and the range of motion is relative linear motion between the first support and the second support.

9. An electrical machine comprising:
a stator providing a set of electrically conductive stator coils;
a rotor positioned to move with respect to the stator and providing a set of electrically conductive stator coils, the rotor and stator operating to provide at least one of an electrical generator and electrical motor; and
a first and second capacitive coupler each having:
(a) a first support fixed with respect to the stator and providing a first electrically conductive material exposed on an outer surface of the first support;
(b) a second support fixed with respect to the rotor and adapted to move with respect to and adjacent to the first support through a range of motion, the second support providing a second electrically conductive material exposed on an outer surface of the second support in opposition across a gap to the first electrically conductive material through the range of motion;
(c) a first and second conductor communicating with each of the first electrically conductive material and second electrically conductive material to communicate an electrical potential between respective of the first and second conductor and the first electrically conductive material and second electrically conductive material; wherein the second conductors are attached to the rotor coils; and
(d) an electrolyte positioned within the gap and cooperating with at least one of the first and second electrically conductive materials to form an electrical double layer presenting a capacitance between the electrical connections of greater than 1 µF.

10. The electrical machine of claim 9 wherein the first and second capacitive coupler provide bearings supporting the rotor with respect to the stator.

11. The electrical machine of claim 10 further including a pump for pumping the electrolyte into the gap through the range of motion.

12. The electrical machine of claim 11 further including at least one spray nozzle communicating with the pump to direct electrolyte over surfaces of at least one of the stator and rotor coils for cooling.

13. The electrical machine of claim 12 wherein the spray nozzle is an orifice on at least one of the first and second capacitive couplers communicating with the gap.

14. The electrical machine of claim 9 wherein the rotor and stator provide a doubly fed induction machine.

15. The electrical machine of claim 9 wherein the rotor and stator provide a homopolar motor.

16. The electrical machine of claim 9 wherein the first supports are a shaft of the rotor about which the rotor rotates.

17. The electrical machine of claim 9 wherein at least one of the first and second electrically conductive materials is activated carbon.

18. The electrical machine of claim 9 wherein the electrolyte is a water solvent holding a dissolved ionic material.

19. The electrical machine of claim 9 wherein the electrolyte is an organic solvent holding a dissolved ionic material.

20. The electrical machine of claim 9 wherein the electrolyte is an ionic liquid.

* * * * *